United States Patent [19]
Paul

[11] Patent Number: 4,836,304
[45] Date of Patent: Jun. 6, 1989

[54] SYSTEM FOR WEIGHING NON-STATIONARY OBJECTS

[75] Inventor: John Paul, Duncan, Okla.

[73] Assignee: Adrian J. Paul, Duncan, Okla.

[21] Appl. No.: 153,983

[22] Filed: Feb. 9, 1988

[51] Int. Cl.⁴ .................. G01G 23/10; G01G 19/52
[52] U.S. Cl. .................................. 177/185; 177/132
[58] Field of Search .................. 177/185, 211, 132

[56] References Cited
U.S. PATENT DOCUMENTS

| | | | |
|---|---|---|---|
| 2,736,549 | 2/1956 | Paul . | |
| 3,938,603 | 2/1976 | Shoberg et al. | 177/211 |
| 4,553,619 | 11/1985 | Fujinaga | 177/185 |
| 4,660,160 | 4/1987 | Tajima et al. | 177/185 X |
| 4,660,662 | 4/1987 | Katz | 177/185 X |
| 4,715,457 | 12/1987 | Amacher et al. | 177/185 X |

OTHER PUBLICATIONS

Undated brochure, Mid-America Scale, Inc.
Exhibit A-A Brochure Entitled: Paul Co., Inc. Livestock Scale Sales-Assembly Instructions for Paul Scale.
Exhibit B-A Brochure Entitled: Paul Farm and Ranch Supply Catalog, copyright 1973, 1986.

Primary Examiner—George H. Miller, Jr.
Attorney, Agent, or Firm—Dunlap, Codding, Peterson & Lee

[57] ABSTRACT

A weighing unit for use with a scale wherein weight signals are inputted into a weight processor. The weight processor is adapted to output a calculated weight of the non-stationary object which closely approximates the actual or dead weight of the non-stationary object. The weight processor receives the weight signals and identifies weight signals close in time which have differences within a predetermined limit and these weight signals are manipulated to determine the calculated weight.

14 Claims, 2 Drawing Sheets

SYSTEM FOR WEIGHING NON-STATIONARY OBJECTS

FIELD OF THE INVENTION

The present invention generally relates to weighing systems and, more particularly, the present invention relates to a weighing system for weighing non-stationary objects.

BRIEF DESCRIPTION OF THE DRAWINGS

Scales of various configurations have been devised in the past for weighing various types of objects. Most prior art scales have provided satisfactory results when the object was stationary on the scale during the weighing process. However, when the object was moving (non-stationary) in various directions (up and down, laterally and side-to-side) during the process, the weight of the object as indicated by the scale at any given time (the instantaneous weight) varied greatly and the determination of the actual, stationary or dead weight of the non-stationary object, to a large extent, was a matter of personal or individual judgement.

For example, when weighing a Brahma calf (non-stationary object example), it virtually is impossible to restrain the calf in a stationary position during the weighing process. Rather, the calf constantly is moving during the weighing process and, thus, the instantaneous weight indicated by the scale varies greatly, thereby making it virtually impossible to obtain the accurate actual weight of the calf.

The present invention provides a weighing unit incorporated with a scale which is adapted to weigh non-stationary objects and to output a calculated weight closely approximating the stationary, actual weight of the non-stationary object. The term "non-stationary object" as used herein means an object to be weighed which moves in a manner causing the instantaneous weight indicated by the scale to vary with time and, although cattle are used herein as examples of such "non-stationary objects", the term "non-stationary object" is not limited in any way to cattle or cattle like objects.

Figure 1:
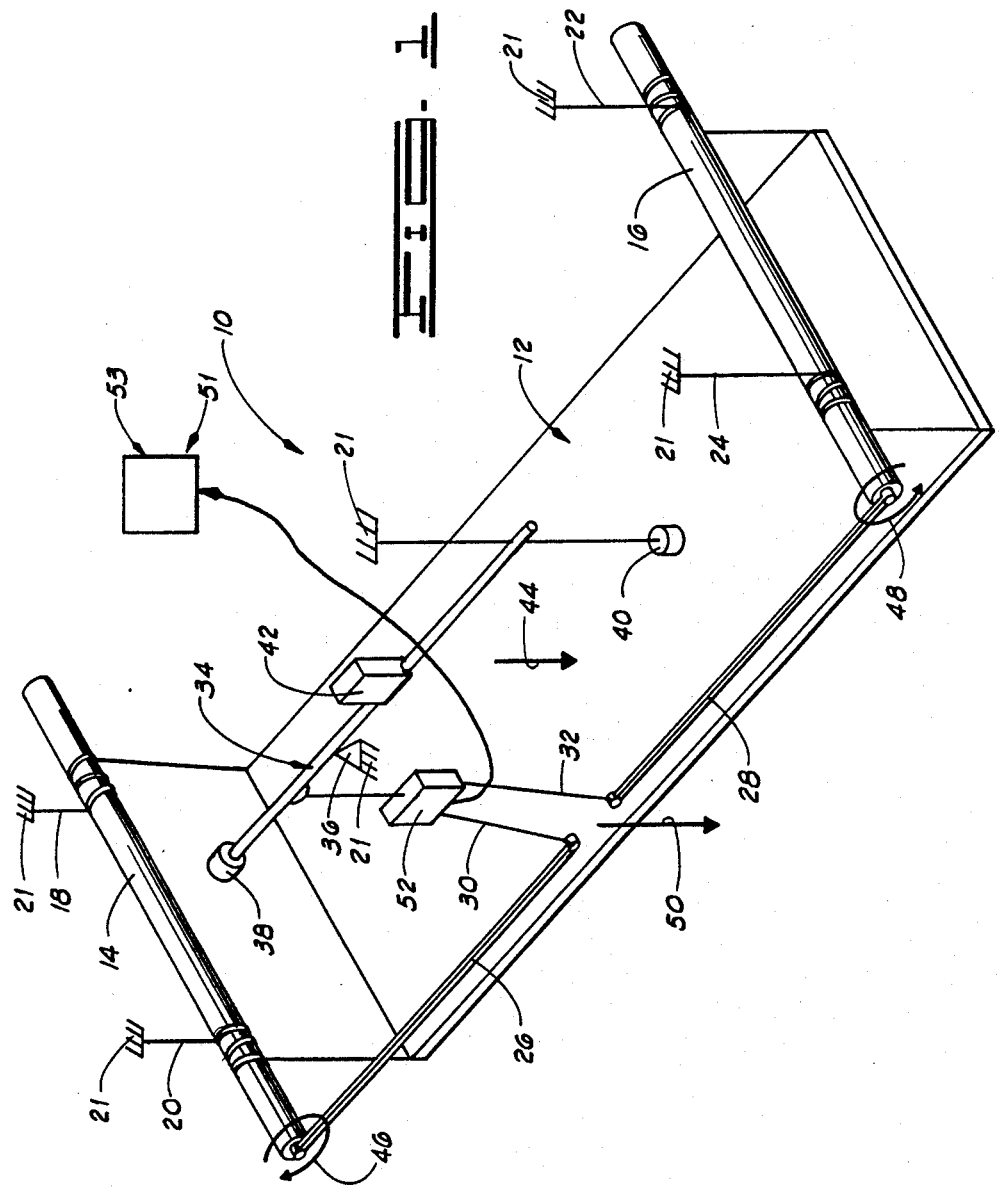
FIG. 1 is a diagrammatic, schematic view of a torque suspension weighing scale having a weighing unit connected thereto and constructed in accordance with the present invention.

Shown in FIG. 1 is a schematic, diagrammatic view of a particular type of scale 10, sometimes referred to herein as a torque suspension weighing scale. The scale 10 includes a platform 12 which is adapted to support the object to be weighed during the weighing process. Bars 14 and 16 are disposed and rotatingly supported at opposite ends of the platform 12.

The bar 14 is supported by two flexible cables 18 and 20. One end of each cable 18 and 20 is connected to a fixed surface (all fixed surfaces being designated by the numeral 21 in FIG. 1 and these fixed surfaces 21 may comprise portions of the scale 10 support structure). Each cable 18 and 20 is wrapped about one end portion of the bar 14 and disposed in grooves formed in the bar 14. The opposite end of each cable 18 and 20 is connected to one end of the platform 12.

The bar 16 is supported in a similar manner by two flexible cables 22 and 24. One end of each cable 22 and 24 is connected to the fixed surface 21. The cables 22 and 24 each are wrapped about one end portion of the bar 16 and disposed in grooves in the bar 16. The opposite end of each of the cables 22 and 24 is connected to one end of the platform 12. The platform 12 is supported at its four corners by the cables 18, 20, 22 and 24.

One end of a lever arm 46 is connected to one end of the bar 14. One end of a lever arm 28 is connectetd to one end of the bar 16. A flexible cable 30 is connected to one end of the lever arm 26, and a flexible cable 32 is connected to one end of the lever arm 28. The opposite ends of the cables 30 and 32 are connected to a conventional weighing beam 34.

The weighing beam 34 is balanced on a fixed knife edge support 36 with a zero balance tail ball 38 at one end and a balance to hold weight multipliers 40 at the opposite end. A moveable poise 42 is positionable to provide the exact balance so the weight on the platform 12 may be visually read from weight graduation marks stamped on the beam 34.

Scales of the type just generally described with respect to the scale 10 and without the incorporation of the weighing unit of the present invention are commercially available from Adrian J. Paul Co, Inc. of Duncan, OK, and the construction and operation of such scales are well known in the art. In addition, a scale of the type just described with respect to the scale 10 and without the incorporation of the weighing unit of the present invention is described in detail in U.S. Pat. No. 2,736,549, issued to C.K. Paul, 1956, and the disclosure of this patent specifically is incorporated herein by reference.

In operation and without the incorporation of weighing unit of the present invention, an object is placed on the platform 12, thereby exerting a weight force on the platform 12 in a generally direction 44. The weight force on the platform 12 exerts torques on the bars 14 and 16 in respective directions 46 and 48 by way of the cables 18, 20, 22 and 24. These torque forces on the bars 14 and 16 result in the lower arms 26 and 28 being forced in a generally downwardly direction 50, thereby placing downwardly directed forces on the cables 30 and 32 which are indicative to the instantaneous weight of the object on the platform 12. In general, these downwardly directed forces are imposed on weighing beam 34, and these forces are counterbalanced by the operator moving the poise 42 to provide the visually perceivable output indication of the weight of the object.

As generally discussed before, scales constructed and operating in the manner just described with the scale 10 and without the incorporation of the weighing unit of the present invention and scales of other types of construction have provided satisfactory results in the past when used to weigh stationary objects. However, such scales have not been successful in providing accurate weight output indications when used for weighing non-stationary objects.

It should be noted that, although the present invention will be described herein with respect to torque suspension weighing scales, such as the scale 10, the present invention also can be utilized in other types of scales or weighing systems. However, the torque suspension weighing scale is preferred because it has been formed that such scales tend to stablize faster when supporting non-stationary objects (substantially rapid return to relatively stationary weights) and this feature is significant in using the present invention for reasons which will be apparent to those skilled in the art from the foregoing description.

The present invention comprises a weighing unit 51 which is operatively connected to the scale 10. In general, the weighing unit 51 comprises a transducer 52 and weight processor 53.

Utilizing the present invention, the weighing beam 34 is connected to the fixed surface 21 and the transducer 52 is interposed in the cables 30 and 32, generally between the arms 26 and 28 and the weighing beam 34. By fixing the weighing beam 34 to the fixed surface 21, all of the forces transmitted through the cables 30 and 32 are imposed on the transducer 52.

The transducer 52 is constructed and adapted to receive the mechanical forces transmitted through the cables 30 and 32 which are proportional to the instantaneous weight of the non-stationary object on the platform 12 at any given time, and to output weight signals which are electrical signals indicative of the instantaneous weight on the platform 12. The weight signals outputted by the transducer 52 are analog signals. However, it should be noted that the transducer 52 could be constructed to include an analog to digital section so the transducer 52 would output weight signals in a digital format. As used herein the term "transducer" simply refers to that portion of a device adapted to receive the mechanical forces transmitted via the cables 30 and 32, and to output analog signals indicative of the instantaneous weight of the non-stationary object on the platform 12 in the response to the received mechanical forces. Transducers of this type are well known in the art and commercially available such as a strain gauge or load cell commercially available from Interface, Inc., Model SM500-38, or any other method for which has been found acceptable in the present weighing application.

The weight signals outputted by the transducer 52 are inputted into the weight processor 53. The weight processor 53 is adapted to determine a calculated weight in response to receiving the weight signals, and the calculated weight is about equal to the actual weight of the non-stationary object being weighed.

Figure 2:
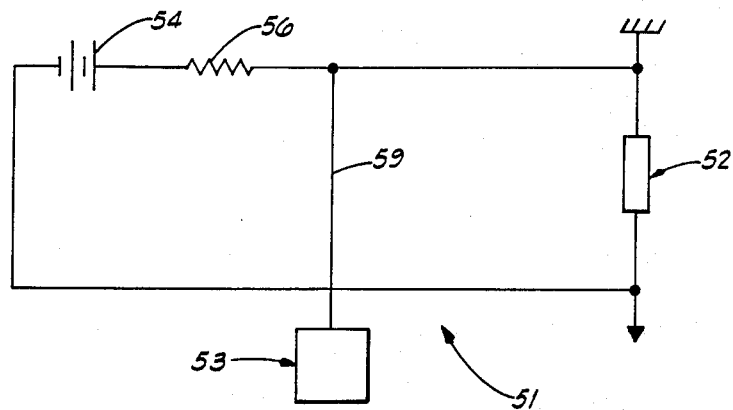
FIG. 2 is a schematic view of a transducer and a weight processor comprising the weighing unit of the present invention.

Shown in FIG. 2 is a schematic representation of the transducer 52 of the strain gauge type. Using this particular type of transducer 52, the transducer 52 is connected to a battery type of power supply 54 by way of a precision resistor 56. The weight forces applied by way of the cables 30 and 32 cause the resistance of the transducer 52 to vary, thereby varying the voltage across the transducer 52 (the analog weight signal) to vary, and the voltages across the transducer 52 are the weight signals which are indicative of the instantaneous weight of the non-stationary object on the platform 12.

The weight signals outputted by the transducer 52 are inputted into the weight processor 53. The weight processor 53 is adapted to sample the weight signals at predetermined time intervals and to convert the received weight signals in the analog format to weight signals in a digital format. The weight processor 53 is adapted to determine the differences between sampled weight signals (weight signals differences). The weight process 53 compares the weight signal differences with a predetermined maximum difference value, and determines the calculated weight of the non-stationary object on the platform 12 from the weight signals having weight signal differences equal to or less than the maximum difference value. The calculated weight then is outputted by the weight processor 53 and the outputted calculated weight is the determined actual weight of the non-stationary object. When the calculated weight is determined in accordance with the present invention it has been found that the calculated weight is extremely close to the actual weight of the non-stationary object being weighed within acceptable tolerances.

As mentioned before, the instantaneous weights of non-stationary object on the platform 12 vary considerably during the weighing process. However, it has been found that the instantaneous weights do remain about the same and about equal to the actual weight of the non-stationary object for predetermined time intervals during the weighing process. These instantaneous weights during these special time intervals, in fact, do represent a very close approximation of the actual weight of the non-stationary object being weighed. In other words, even though the object to be weighed is non-stationary, there are special time intervals during which the instantaneous weights outputted by the transducer 52 represent the actual weight or a very close approximation thereof of the non-stationary object.

Figure 3:
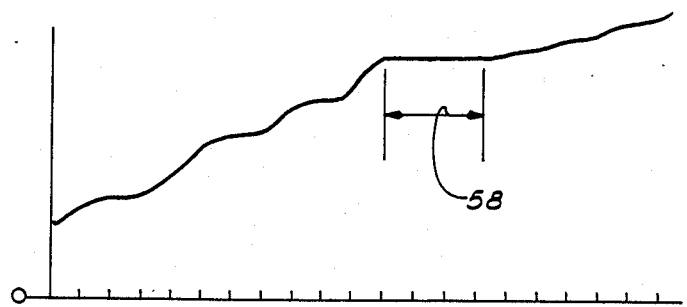
FIG. 3 is a diagrammatic view illustrative of a typical plot of voltage drop (weight signals) versus time, time being plotted on the "x" axis or abscissa and voltage drop being plotted on the "y" axis.

Shown in FIG. 3 is a diagrammatic view of a plot of illustrative voltage drops (weight signals) on the "y" axis outputted by the transducer 52 versus time on the "x" axis during one small time interval during weighing process involving a non-stationary object. As may be observed, the weight signals vary with time as a somewhat random function. However, there is a time interval 58 during which the weight signals do not vary to any great extent and it has been found that the instantaneous weights associated with the weight signals during this time interval 58 are representative of the actual weight of the non-stationary object within acceptable tolerances. It should be noted that the total time interval represented in FIG. 3 is relatively small and random curves of various types may be repeated several times over longer time intervals as compared to the time interval depicted in FIG. 3 depending on the type and degree of movement of the non-stationary object on the platform 12.

The weight processor 53 is adapted and programmed to identify this time interval 58 and the instantnaeous weights associated with this time interval 58. The weight processor 53 further is adapted and programmed to determine the calculated weight of the non-stationary object from the instanteous weights associated with this time interval 58 or like time intervals.

The weight processor 53 has programmed in it the maximum difference value and a predetermined sample time interval. The weight processor 53 samples the weight signals every predetermined time interval.

Each sampled weight signal is compared by the weight processor 53 with the next, sampled weight signal to determine the difference between the two sampled weight signals, (weight signal differences). The weight signal differences are compared with the maximum difference value. If a weight signal difference exceeds the maximum difference value, these sampled weight signals associated with this weight signal difference are discarded, and the process of sampling weight signals and determining weight signal differences is continued until a predetermined number of weight signal differences are determined which are equal to or less than the maximum difference value. When this group comprising sampled weight signals associated with weight signal differences equal to or less than the maximum difference value are determined, the weight processor 53 is programmed to determine the calculated weight of the non-stationary object on the platform 12 using these weights signals only. The calculated weight is equal to the actual or dead weight of the non-stationary object at least within an acceptable tolerance. The calculated weight of the non-stationary object then is stored in the weight processor 53 and also may be outputted by the weight process 53.

By way of illustrating the operation of the weight processor 53, assume the predetermined sample time interval is 0.1 seconds (that is, a weight signal is inputted into the weight processor 53 every 0.1 seconds) and assume the predetermined maximum difference value is 2.0 pounds. Table I below is a simplifed, illustrative example showing the sampled weight signals in weight units (pounds) over a sampling interval of time from P (0.1 second) to P+1.3 (1.4 seconds) and showing the weight signal differences in weight units (pounds) wherein the weight processor 53 is programmed to determine a group of at least 5 weight signal differences equal to or less than the maximum difference value of 2.0 pounds.

TABLE I

| Sample Time | Sampled Weight Signals | Weight Signal Differences |
| --- | --- | --- |
| P | 355 | — |
| P + 0.1 | 367 | 12.0 |
| P + 0.2 | 382 | 15.0 |
| P + 0.3 | 407 | 25.0 |
| P + 0.4 | 421 | 14.0 |
| P + 0.5 | 435 | 14.0 |
| P + 0.6 | 451 | 16.0 |
| P + 0.7 | 453 | 2.0 |
| P + 0.8 | 452 | −1.0 |
| P + 0.9 | 453 | 1.0 |
| P + 1.0 | 451 | −2.0 |
| P + 1.1 | 453 | 2.0 |
| P + 1.2 | 460 | 7.0 |
| P + 1.3 | 475 | 15.0 |

From Table I above, there are 6 sampled weight signals associated with 5 weight signal differences equal to or less than the maximum difference value. That is, the sampled weight signals associated with the sample times of P+0.6, P+0.7, P+0.8, P+0.9, P+10 and P+1.1. In one embodiment, the weight processor 53 determines the calculated weight by determining the average weight of the sampled weight signals associated with the 5 weight signal differences which are less than or equal to the maximum difference value of 2.0; that is, [(451+453+452+453+451+453)/6], a calculated weight of 452.17 pounds. It should be noted that the maximum difference value is an absolute number in the sense it represent a plus or minus value.

In one other embodiment, the weight processor 53 is programmed to search for groups of sampled weight signals wherein pairs of weights signals within the group have weight signals differences equal to or less than the maximum difference value, significant groups, and the calculated weight is determined from weight signals within the selected groups. More particularly, a maximum group difference value (an absolute value) is programmed into the weight process 58. The weight processor 53 first determines that all possible differences between weight signals within the group are equal to or less than the maximum difference value. The weight processor 53 then determine the average of the weight signals within the each group, group weight signal averages. The differences between group weight signal averages then are comapred with the maximum group difference value. Significant groups are determined to be groups associated with differences of group weight signal averages equal to or less than the maximum group difference value. The calculated weight is determined as the average of the group weight signal averages of the significant groups.

To illustrate the method just described, assume the sample times, sample weight signals, the weight signal differences and the maximum difference value as described before in connection with Table I above. Further, assume a maximum group difference value of 1.0 pounds has been programmed into the weight processor 53, and the group is determined to comprise three weight signals and this value is programmed in the weight procesor 53. This system for determining the calculated weight is illustrated in Table II below using a portion of the information in Table I as described before.

TABLE II

| Step Number and Numerical Example | Weight Processor 58 Function | Comments |
| --- | --- | --- |
| 1. 355 | Input Sample "P" | Bring in a Sample |
| 2. 367 | Input Sample "P + 0.1" | Bring in next Sample |
| 3. 367 − 355 = 12 | Substract samples | Compute weight signal difference |
| 4. 12 > 2 | Compare weight signal difference with maximum difference value of 2.0 | The difference cannot exceed the maximum difference value |
| 5. Go to Step 1 | Repeat Steps 1-4 until limits are met | Wait for a weight signal difference value equal to or less than 2.0 (maximum difference value) |
| 6. 453 | Input weight signal "P + 0.7" | Ready to compare with weight signal "P + 0.6" |
| 7. 453 − 451 = 2 | Substract sampled weight signals | Compare weight signal difference |
| 8. 2 = 2 | Compare weight signal difference with maximum difference value of 2.0 | Within predetermined limit of 2.0 |
| 9. Save | Save 453 and 451 | Save Samples P + 6 and |

TABLE II-continued

| Step Number and Numerical Example | Weight Processor 58 Function | Comments |
|---|---|---|
| 10. Go to 1 | Repeat Steps 1-9 to obtain a second pair with the 2.0 limit | P + 7 Wait for another sample weight signal difference within the limit |
| 11. 452 | 452 − 453 = −1 | This pair has a sample weight signal difference within the 2.0 limit |
| 12. Save | Save 452 and 453 | Save Samples P + 7 and P + 8 |
| 13. Average | (453 + 451)/2 = 452 | Take average of first pair (group weight signal average) |
| 14. Average | (452 + 453)/2 = 452.5 | Take average of second pair (group weight signal average) |
| 15. Difference | (452.5 − 452) = 0.5 | The two averages have a group weight signal difference |
| 16. 0.5 < 1.0 | Difference between group weight signal averages is equal to or less than the maximum group difference value - declared to be significant groups | The preset limit for the pairs (maximum group difference value is 1.0, if pair difference exceed this value - the search for pair differences within the limit is continued |
| 17. Calculated Weight | (average 1 + average 2)/2 = 452.25 | The average of the group weight signal averages of significant groups is the calculated weight |

As may be observed from Table I above the instantaneous weight (every 0.1 seconds) of the non-stationary object on the platform 12 is changing fairly rapidly. In this example, the instantaneous weight varied from a low of 355 pounds to a high of 475 pounds over 1.4 seconds. The changing instantaneous weight is caused by the action of the non-stationary object's kinetic force adding to its actual or dead weight.

Utilizing a torque suspension weighing system of the type described before with respect to the scale 10, the change in instantaneous sample weights slows dramatically as the instantaneous sample weight passes through the actual or dead weight of the non-stationary object. This effect combined with rapid sampling permits the weight processor 53 to detect this "slowing period" and to process the sampled weight signals obtained during this "slowing period". Other types of scales are expected to stablize in a similar manner. However, it is expected that longer time periods generally will be required to detect this so-called "slowing period". Thus, the torque suspension weighing scale certainly is a preferred type of scale for use in the present weighing process.

Utilizing the weight signal differences and the maximum difference value and significant groups, represent only two methods for manipulating the sampled weight signals after determining weight signals having weight signal differences within the preset limits to obtain the calculated weights. The main feature is to identify the "slowing" in the rate of change in weight signals and this is accomplished by comparing each received weight signal with the next received weight signal (comparing weight signals close in time) to determine sampled weight signal differences and then comparing the sampled weight signal difference with the maximum difference value.

One other way to manipulate the weight signals having weight signal differences equal to or less than the maximum difference value is to identify a group of weight signals close in time wherein the weight signal differences are equal to or less than the maximum difference value and then to manipulate the weight signals within the group further by comparing each possible weight signal difference within the group with the predetermined maximum difference value. If all possible weight differences within the group are less than or equal to the maximum difference value, then, the average of the weight signals within the group is determined, group weight signal averages. The differences between group weight signal averages is determined and compared with the predetermined maximum group difference value and significant groups are determined based on this comparison. The calculated weight then is determined using the group weight signal averages. This technique is illustrated in Table II for a group comprising two weight signals. The group could comprise three or more weight signals, for example.

For example, assume a group is determined to comprise three consecutive weight signals (triplets). Further, assume the weight signals are processed in terms of counts wherein a count of 342 converts to a weight on the platform 12 of 250 pounds. Further, in this example, assume the maximum weight difference value is represented by a 3 count and assume a 3 count limit is established as the maximum group difference value for the difference between triplet averages. In this example, sampling time is 0.1 seconds. The count simply represents a digital representation of weight units. Table III below represents a portion of the actual printout of a weight processor 53 constructed and programmed in accordance with the present invention and connected to a scale 10 of the torque suspension weighing scale type described before and schematically shown in FIG. 1.

tively stationary. Rather, this type of non-stationary remains non-stationary substantially throughout the

TABLE III

```
343  342  342  342  342  342  342  342  342  342  342  342  342  341  342  342  342  342  342  342
342  342  342  342  342  345  346  373  403  453  525  558  593  629  647  651  634  630  628  653
641  654  638  646  681  680 |670  668  670| 693  687  689 |682  680  683  686  683| 683  681  680
689  688  686  687                      685  685  684  685  684  684  684  684  685  685  684  684
684  684  684  684  684  683  686  684  684  685  684  685  684  685  685  684  685  684  684  684
685  684  684  684  685  684  684  683  685  684  684  683  684  685  685  684  685  684  683  683
684  685  684  684  685  685  685  686            685  685       685  685  685  685  686  685  685  685
686  685  685  686  684  685  684  684  685  685  685  684  685  684  684  684  686  685  686  687
685  685  684  685  685  686  685  684  685  685  685       684  684  685  685       685  684  685
685  685  686  683  683  683  685  685  685  685  685                           684  685  685  684
684  685  685  684  685  684  683  684  685  686  683  685
``` weighing process.

In Table III, three triplets were identified and utilized by the weight processor 53 in determining the calculated weight. Each of the three triplets (Triplet A, Triplet B and Triplet C) is enclosed in a block in Table III, Triplet A containing the weight counts 670, 668 and 670, Triplet B containing the weight counts 682, 680 and 683, and Triplet C containing weight counts 683, 686 and 683. In this example, Triple C partially overlaps Triplet B. The average count of Triplet A is 669.3 counts, and the average count of Triplet B is 682.5 counts. The difference between the average of Triplet A and the average of Triplet B (13.2) exceeds the maximum difference value of 3 counts and, thus, Triplet A is discarded. Triplet C has an average count of 684 and, thus, the difference (1.5) between the average of Triplet B (682.5) and the average of Triplet C (684) is within the limit defined by the maximum difference value of 3 counts. Thus, the average of the weight signals of Triplets B and C is determined to be the calculated weight. In this instance, the average is 683.25 counts. In this example, the platform 12 weight represented by 342 counts must be substracted from the 683.25 count to determine the calculated weight of the non-stationary object (683.25–342 =341.25 represents the calculated weight of the non-stationary object).

In the example represented by Table III, an individual stepped onto the platform 12 and walked to the middle of the platform 12. Thus, the initial counts shown in Table III of about 342 represent the platform 12 weight without any object supported on the platform 12. Further, after the individual reached the middle of the platform 12, the individual remained relatively stationary and, thus, the latter counts in Table III represent the actual or dead weight of the individual of 685 (including the platform 12 weight). The difference between the calculated weight 341.25 and the actual weight of the object 343 (685–342) is 1.75 counts which is well within the tolerance of 3 counts established in this example.

The example, represented in Table III and described before, illustrates a test of system of the present invention. In this test, since the object to be weighed remained stationary for a rather long period of time after reaching the middle of the platform 12, the actual or dead weight of the object could have been determined rather easily by simple observation in the normal manner. However, this example does illustrate the use of triplets and this example does illustrate the accuracy of the present weighing technique. Further, this example provided a stationary weight at one point so the actual or dead weight could be compared with the calculated weight. In most applications, a typical non-stationary object such as a Brahma calf will not quietly move to the center of the platform 12 and, then, remain relatively stationary. Rather, this type of non-stationary remains non-stationary substantially throughout the weighing process.

Figure 4:
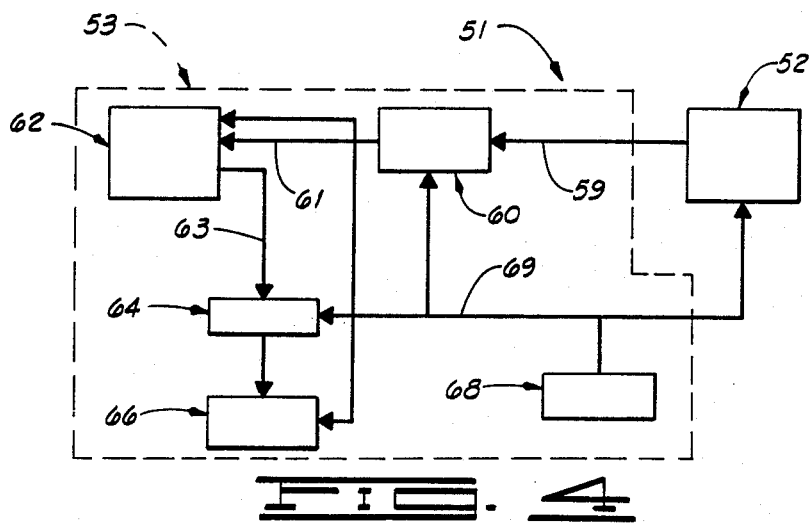
FIG. 4 is a diagrammatic view of the weighing unit.

Shown in FIG. 4 is a schematic, diagrammatic view of one embodiment of the weighing unit 51 of the present invention. The transducer 52 outputs weight signals in an analog format on a signal path 59, and these weight signals are inputted into an analog to digital converter 60. The analog to digital converter 60 converts the received weight signals in an analog format to weight signals in a digital format, and the weight signals in a digital format are outputted by the analog to digital converter 60 on a signal path 61. The outputted weighted signals in the digital format are inputted into a processor 62. The processor 62 is adapted and programmed to process the weight signals in the manner described before with respect to the weight processor 53 for determining the calculated weight of the non-stationary object. The processor 62, in this embodiment, is programmed to output on command the calculated weight or weights on a signal path 63 through a serial communcation link 64 to a printer 66. The serial communication link 64 is adapted to interface between the processor 62 and the printer 66. The printer 66 is adapted to output the inputted calculated weights in a visually perceivable printed format.

In the embodiment shown in FIG. 4, the transducer 52 is a load cell of the type described before, and, in one operational embodiment, the components of the weight processor 58 were as follows:

| Description | Manufacturer |
| --- | --- |
| Analog to digital converter 60 | Adrian J. Paul, Co. Model PC-2 |
| Processor 62 | Psion, Inc. Model Organizer II/XL |
| Serial communication link 64 | Psion, Inc. Model Commslink RS 232C |
| Printer 66 | Weightronics, Inc. Model 300 Baud IMP-24 RS232C |

As mentioned before, the weight processor 53 particularly is adapted to weigh non-stationary objects such as cattle. In many instances, this type of weighing process is carried out in the field at remote locations where stationary power supplies are not readily available for providing operating power for the weighing unit 51. Thus, in the embodiment shown in FIG. 4 and with the particular components identified above, the weight processor 53 is portable and supplied operating power by a battery 68 (FIG. 4). The battery 68 supplies operating electrical power over a signal path 69 for all of the components of the weight processor 53, that is, the analog to digital converter 60, the processor 62, the serial communication link 64 and the prnter 66. The serial communication link 64 permits the accumulated results of a number of calculated weights to be sent to the printer 66 for on-site inspection of the date and or to be connected to a larger host computer for more sophisticated data-base management functions after all of the weighings have been completed. With the portable weight processor 53 described before, the scale 10 also is portable and portable torque suspension weighing scales are commerically available from Adrian J. Paul Company, Inc., mentioned before.

The particular analog to digital converter 60, identified above, actually supplies the operating power signal to the transducer 52 and the battery 68 does not supply such power signal directly to the transducer 52 as depicted in FIG. 4. The battery 54 (FIG. 4) actually represents either the battery 68 as shown in FIG. 4 or the power signal supplied through the analog to digital converter 60.

It should be noted that a rapid sampler might be utilized which would sample the weight signals at a rate of 100,000 times per second for example. In this event, one would select weight signals at predetermined time intervals such as 0.1 second for example for processing in accordance with the present invention. In this instance the term "sampling the weight signals at predetermined time intervals" as used herein refers to selected weight signals at the 0.1 second interval even though technically there are other samples weight signals.

Changes may be made in the various components and assemblies described herein or in the steps or sequence of the steps described herein without departing from the spirit and the scope of the invention as defined in the following claims.

What is claimed is:

1. An improvement in a torque suspension weighing scale characterized by a substantially rapid return to relatively stationary weight values to adapt the scale for weighing nonstationary objects on the scale to determine the actual weight of the non-stationary object, wherein a platform is suspended by two bars connected to the platform and to fixed surfaces by flexible cables, the improvement comprising:
    a transducer connected to the scale for generating weight signals, each weight signal being indicative of the instantaneous weight at the time generated of the non-stationary object on the scale; and
    a weight processor for receiving the weight signals, the weight processor sampling the weight signals at predetermined time intervals, and comparing each sampled weight signal with the next sampled weight signal to determined weight signal differences with a predetermined maximum difference value and using at least some of the weight signals associated with the weight signal difference equal to or less than the maximum difference value to determine the calculated weight of the non-stationary object on the scale, the calculated weight being about equal to the actual weight of the non-stationary object and the weight processor outputting this one calculated weight.

2. The improvement of claim 1 wherein the weight processor is defined further as comparing each weight signal difference with the predetermined maximum difference value to determine at least one group weight signals having weight signal difference equal to or less than the maximum difference value, and determining the calculated value of the non-stationary object using the weight signals in each group.

3. The improvement of claim 2 wherein the weight processor is defined further as to determine the calculated weight from the average of the weight signals in the groups.

4. The improvement of claim 1 wherein the weight processor is further defined as being adapted to compare each weight signal difference with the maximum difference value to determine at least one group of weight signals having weight signal difference equal to or less than the maximum difference value, and comparing all possible differences between weight signals in each group with the maximum difference value to determine significant groups wherein all possible difference between weight signals within the significant group are equal to or less than the maximum difference value, and determining the calculated weight from the weight signals in each significant group.

5. The improvement of claim 4 wherein the weight processor is defined further as being adapted to determine the calculated weight from the average of the weight signals in the significant groups.

6. The improvement of claim 4 wherein the processor is further defined as being adapted to determine the average of the weight signals in each significant group to be a group weight signal average, and to determine the difference between pairs of groups weight signal averages, the weight processor comparing each difference between pairs of group weight signal average with a maximum group difference value and determining significant groups to comprise pairs of group weight signals wherein the difference between the group weight average of said pair is less than or equal to the group difference value.

7. The improvement of claim 6 wherein the weight processor is further defined as determining the calculated weight from the average of the group weight signal averages of the significant groups.

8. The improvement of claim 6 wherein each group comprises at least two weight signals.

9. The improvement of claim 6 wherein each group comprises at least three weight signals.

10. The improvement of claim 1 wherein each weight signal is defined further as comprising a scale weight and the instantaneous weight of the non-stationary object, and wherein the weight processor is defined further as determining the calculated weight using at least some of the weight signals associated with the weight signal differences equal to or less than the maximum difference value to be the calculated weight of the non-stationary object on the scale plus the scale weight, the weight of the non-stationary object on the scale being determined by the weight processor by substracting out the scale weight.

11. The improvement of claim 1 wherein the weight signals are defined further as being in an analog format, and wherein the weight processor is defined further to comprise:
    an analog to digital converter receiving the weight signals in the analog format from the transducer and converting the weight signals to weight signals in a digital format, the analog to digital converter outputting the weight signals in the digital format; and
    a processor receiving the weight signals in the digital format, the processor sampling the weight signals at predetermined time intervals, and comparing each sampled weight signal with the next sampled weight signal to determined weight signal differences and comparing each weight signal difference with the predetermined maximum difference value and using at least some of the weight signal associated with the weight signal difference equal to or less the maximum difference value to determine the calculated weight of the non-stationary object on the scale, the calculated weight being about equal to the actual weight of the non-stationary object.

12. The improvement of claim 11 wherein the weight processor is defined further to include:

a serial communication link for receiving calculated weights from the processor and being adapted to link the outputted calculated weights to an output device or other processor for downloading the calculated weights.

13. The improvement of claim 11 wherein the weight processor is defined further to comprise:

a printer for receiving the calculated weights from the processor and outputting the calculated weights in a human perceivable format.

14. The improvement of claim 11 wherein the processor is adapted to operate with power signals, and wherein the weight processor is defined further to comprise:

a battery for supplying power signals to the processor so the weight processor can be moved to and operated at remote locations.

* * * * *